(12) United States Patent
Koyama et al.

(10) Patent No.: US 6,291,797 B1
(45) Date of Patent: Sep. 18, 2001

(54) LASER MACHINING METHOD FOR GLASS SUBSTRATE, DIFFRACTION TYPE OPTICAL DEVICE FABRICATED BY THE MACHINING METHOD, AND METHOD OF MANUFACTURING OPTICAL DEVICE

(75) Inventors: Tadashi Koyama; Keiji Tsunetomo, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/284,269

(22) PCT Filed: Aug. 11, 1997

(86) PCT No.: PCT/JP97/02806

§ 371 Date: Jun. 4, 1999

§ 102(e) Date: Jun. 4, 1999

(87) PCT Pub. No.: WO98/06676

PCT Pub. Date: Feb. 19, 1998

(30) Foreign Application Priority Data

Aug. 13, 1996 (JP) .................................. 8-213391
Aug. 13, 1996 (JP) .................................. 8-213392

(51) Int. Cl.[7] .............................................. B23K 26/02
(52) U.S. Cl. .................. 219/121.73; 216/65; 219/121.69
(58) Field of Search ............... 219/121.73, 121.69, 219/121.77, 121.68; 429/556, 555; 216/11, 65

(56) References Cited

U.S. PATENT DOCUMENTS 2,751,419  6/1956  Hill, Jr. et al. ....................... 260/615
4,120,903  10/1978  Pruckmayr et al. .................. 260/615

(List continued on next page.)

FOREIGN PATENT DOCUMENTS 43 38 969   9/1996  (DE) .
195 44 295  6/1997  (DE) .
0 181 621   5/1986  (EP) .
  629 592   2/1994  (EP) .
0 597 502   5/1994  (EP) .

(List continued on next page.)

OTHER PUBLICATIONS

Derwent Abstract for JP 7278377—(Mitsubishi Chem Corp.) Shichijo et al. Oct. 24, 1995.
Derwent Abstract for JP 8269264—(Nippon Gosei Gomu KK (JAPS) Ishikawa et al. Oct. 15, 1996.
Derwent Abstract for JP 9087330—(Tosoh Corp.), Ogusu et al. Mar. 31, 1997.
Derwent Abstract for JP 9141793 A—(Tosoh Corp.), Ogusu et al. Jun. 3, 1997.
Derwent Abstract for JP 9141792 A—Noya et al. Jun. 3, 1997.

(List continued on next page.)

*Primary Examiner*—Tom Dunn
*Assistant Examiner*—Jonathan Johnson
(74) *Attorney, Agent, or Firm*—Merchant & Gould P. C.

(57) ABSTRACT

In a laser processing method for accurately forming a convexo-concave structure on the surface of a glass substrate, a periodic optical intensity distribution of a laser beam is obtained by an interference between diffracted light beams of +1 degree and −1 degree emitted from a phase mask, onto which the laser beam is irradiated, in the vicinity of the emission side of the phase mask, and a glass substrate, on which a thin film is formed, is set in the area where the periodic optical intensity distribution is provided. As a result, the thin film is evaporated or ablated depending on the periodic optical intensity, thereby a diffraction grating, which has the same period as that of the varying optical intensity, is formed on the glass substrate.

10 Claims, 9 Drawing Sheets

U.S. PATENT DOCUMENTS

| | | | |
|---|---|---|---|
| 4,153,786 | 5/1979 | Pruckmayr | 528/408 |
| 4,568,775 | 2/1986 | Aoshima et al. | 568/617 |
| 4,744,615 * | 5/1988 | Fan et al. | |
| 5,072,091 * | 12/1991 | Nagata et al. | |
| 5,206,075 | 4/1993 | Hodgson | 428/216 |
| 5,322,726 | 6/1994 | Dew | 428/216 |
| 5,358,792 | 10/1994 | Mehta et al. | 428/516 |
| 5,376,439 | 12/1994 | Hodgson et al. | 428/229 |
| 5,397,613 | 3/1995 | Georgelos | 428/36.7 |
| 5,414,239 * | 5/1995 | Terabayashi et al. | |
| 5,424,362 | 6/1995 | Hwang et al. | 525/71 |
| 5,482,770 | 1/1996 | Bekele | 428/339 |
| 5,508,489 * | 4/1996 | Benda et al. | |
| 5,523,136 | 6/1996 | Fischer et al. | 428/35.2 |
| 5,530,065 | 6/1996 | Farley et al. | 525/240 |
| 5,604,043 | 2/1997 | Ahlgren | 428/518 |
| 5,629,059 | 5/1997 | Desai et al. | 428/34.9 |
| 5,824,374 * | 10/1998 | Bradley, Jr. et al. | |
| 5,851,335 * | 12/1998 | Budnik et al. | |
| 5,910,256 * | 6/1999 | Tsunetomo et al. | |
| 5,951,731 * | 9/1999 | Tsunetomo et al. | |
| 6,008,467 * | 12/1999 | Tsunetomo et al. | |
| 6,143,382 * | 11/2000 | Koyama et al. | |

FOREIGN PATENT DOCUMENTS

| | | |
|---|---|---|
| 0682 272 | 11/1995 | (EP) . |
| 0 764 679 | 3/1997 | (EP) . |
| 50-42499 | 4/1975 | (JP) . |
| 63-30931 | 12/1984 | (JP) . |
| 63-30932 | 12/1984 | (JP) . |
| 4-253583 | 9/1992 | (JP) . |
| 5-200577 | 8/1993 | (JP) . |
| 5-303916 | 11/1993 | (JP) . |
| 7-4675 | 1/1995 | (JP) . |
| 7-051400 | 6/1995 | (JP) . |
| 7-168023 | 7/1995 | (JP) . |
| 7-102470 | 11/1995 | (JP) . |
| 8-009794 | 1/1996 | (JP) . |
| 8-025045 | 3/1996 | (JP) . |
| 8-057678 | 3/1996 | (JP) . |
| 8-508207 | 9/1996 | (JP) . |
| 9-99957 | 4/1997 | (JP) . |
| 9-99973 | 4/1997 | (JP) . |
| 9-141792 | 6/1997 | (JP) . |
| 9-141793 | 6/1997 | (JP) . |
| 9-150488 | 6/1997 | (JP) . |
| 9-150489 | 6/1997 | (JP) . |
| WO 92/14784 | 9/1992 | (WO) . |
| WO 93/03093 | 2/1993 | (WO) . |
| 94/04744 | 3/1994 | (WO) . |
| WO 94/06857 | 3/1994 | (WO) . |
| WO 94/25271 | 11/1994 | (WO) . |
| WO 94/26816 | 11/1994 | (WO) . |
| WO 95/00333 | 1/1995 | (WO) . |
| WO 95/13321 | 5/1995 | (WO) . |
| WO 95/16724 | 5/1995 | (WO) . |
| WO 95/15851 | 6/1995 | (WO) . |
| WO 95/16729 | 6/1995 | (WO) . |
| WO 95/21743 | 8/1995 | (WO) . |
| WO 96/19533 | 6/1996 | (WO) . |
| WO 93/32441 | 10/1996 | (WO) . |
| WO 97/28960 | 8/1997 | (WO) . |
| WO 97/44178 | 11/1997 | (WO) . |

OTHER PUBLICATIONS

Derwent Abstract for EP 0 764 679 A1 Kaschel et al. Mar. 26, 1997.

Holmer, Anna–Karin, Simultaneous machining of parallel grooves in $SnO_2$ thin films using a ND:YAG laser and a kinoform, May 20, 1996, pp. 2614–2618, *Applied Optics*, vol. 35, No. 15.

Yablonovitch, E., "Photonic band–gap structures" *J. Opt. Soc. Am.*, vol. 10, No. 2, Feb. 1993.

Tyan, Rong–Chung, Pang–Chen Sun, Axel Scherer and Yeshayahu Fainman, "Polarizing beam splitter based on the anisotropic spectral reflectivity characteristic of fom–birefringent multi–layer gratings", *Optics Letters*, vol. 21, No. 10, May 15, 1996.

Murahara, Masataka; Yoshiyuki Kawamura; Koichi Toyoda, and Susumu Namba, "Fabrication of PMMA Holographic Grating by KrF Excimer Laser", Dec. 14, 1981.

* cited by examiner

(b)   Convex  Concave

(b)　Convex　Concave

LASER MACHINING METHOD FOR GLASS SUBSTRATE, DIFFRACTION TYPE OPTICAL DEVICE FABRICATED BY THE MACHINING METHOD, AND METHOD OF MANUFACTURING OPTICAL DEVICE

BACKGROUND OF THE INVENTION

1. Field of the Invention

The present invention relates to a laser processing method for processing a micro convexo-concave structure on a surface of a glass substrate and an optical diffraction element obtained by the laser processing method, and to a method for manufacturing an optical element including a diffraction grating which is used as a polarized light beam splitter, a coupling grating or the like, a diffraction type optical element which is used for a hologram, or an optical element such as a photonic crystal which is used as a birefringent plate, a light beam scatter plate or the like.

2. Description of Related Art

A glass plate has superior characteristics with respect to flatness, processing accuracy, weather resistance, heat resistance, etc. Therefore, there are already known devices such as a diffraction grating for use in optical communication and so on, or a micro lens for installation in a display device, which are formed by performing micro processing on a surface of a glass substrate.

For treating such micro processed regions on the glass substrate, conventionally, there is generally known a wet etching (chemical etching) method by using an etchant including hydrofluoric acid, etc., or a dry etching (physical etching) method by using a reactive ion etching, etc.

However, there is a problem with the care and the treatment of the etchant in the wet etching, and also a problem in the dry etching in that the facility of a vacuum container is necessitated, thereby requiring a large-scale facility by itself. Additionally, it is not cost-effective because a-pattern mask and the like must be formed by a further complicated photolithography technique.

Moreover, an element for dividing wavelength, such as a diffraction grating, etc., which is available commercially at a relatively cheap price, is industrially produced by a method of obtaining an original negative plate by cutting a metal plate of aluminum or the like with a diamond blade (so called "a ruling engine") and transferring upon an epoxy resin on the basis thereof.

In the above-mentioned industrial production method for the diffraction grating, a large-scale facility for the ruling is also necessitated, and as well, the element for dividing wavelength must be transferred onto organic materials for the mass production thereof. The transfer onto the organic materials shows good formability, however, it has a disadvantageous limit with respect to resistance against humidity and excessive temperatures.

On the other hand, it is known that a laser beam has strong energy so that the temperature of an irradiated surface of any arbitrary material increases resulting in ablation or evaporation of the irradiated portion thereof. Therefore, conventionally, a laser beam has been utilized in various processings or machining methods. In particular, the method of using a laser has been adapted to micro processing or machining because the laser beam can be easily focused onto a very fine spot.

Then, in the prior art, various methods for achieving such micro processing are already known, in an which a periodic optical intensity distribution of the laser beam is obtained by causing a plurality of laser beams to mutually interfere. The mutually interfering beams are then radiated onto the surface of the material to be processed, such as a metal plate or the like, as disclosed for example, in Japanese Laid-open Patent Nos. Sho 50-42499(1975) and Hei 4-253583(1992), and in Japanese Patent Publication Nos. Hei 7-4675(1995), Hei 7-47232(1995), Hei 7-51400(1995), Hei 7-102470(1995), Hei 8-9794(1996), and Hei 8-25045(1996).

In particular among them, in Japanese Patent Publication No. Hei 8-25045(1996), a wave guide (a thin layer or film) having an index of refraction higher than air and that of the material to be processed is provided on the material to be processed, such as the metal plate or the like, and the laser beam is radiated onto the wave guide, thereby forming micro convexo-concave patterns in the wave guide by interference between the light beams transmitted in the wave guide and the radiated light beam, and providing a rainbow color developing function on the surface of the material to be processed.

Further, in one publication ("An Applied Physics", by Masataka Murahara et al., Volume number 52, No. 1 (1983), in particular on page 84 thereof) it is reported that the micro convexo-concave structure of the organic thin film was directly produced by ablation of an organic macromolecule thin film, such as PMMA (polymethyl methacrylate) coated onto the glass substrate, using the interference light beam from an excimer laser.

In any one of the prior arts mentioned above, the thin film is formed on the surface of the substrate, thereby achieving a micro processing or machining thereon by absorbing the laser beam energy into the thin film to cause the ablation thereof. However, none of them takes into any consideration at all the energy of the laser beam.

Namely, although it was conventionally already known that a laser beam having an intensity higher than a certain level of energy must be irradiated to cause the ablation and so on, not only is the micro convexo-concave structure formed on the thin film, but also the substrate itself is processed or affected by the laser, in a case where the thin film is formed on the surface of the substrate. In particular, if the energy of the laser beam which reaches the substrate through the thin film is greater than a certain energy (threshold) that is enough to cause ablation on the substrate.

If micro processing on the substrate, which is different in physical property from the thin film, is being carried out at the same time, it cannot be used as an optical element, such as the diffraction grating, etc., for which is required a certain level of accuracy thereof.

Further, it has a disadvantage with respect to the characteristics of weather resistance and heat resistance, in the case where the thin film comprises organic macromolecules.

Figure 10:
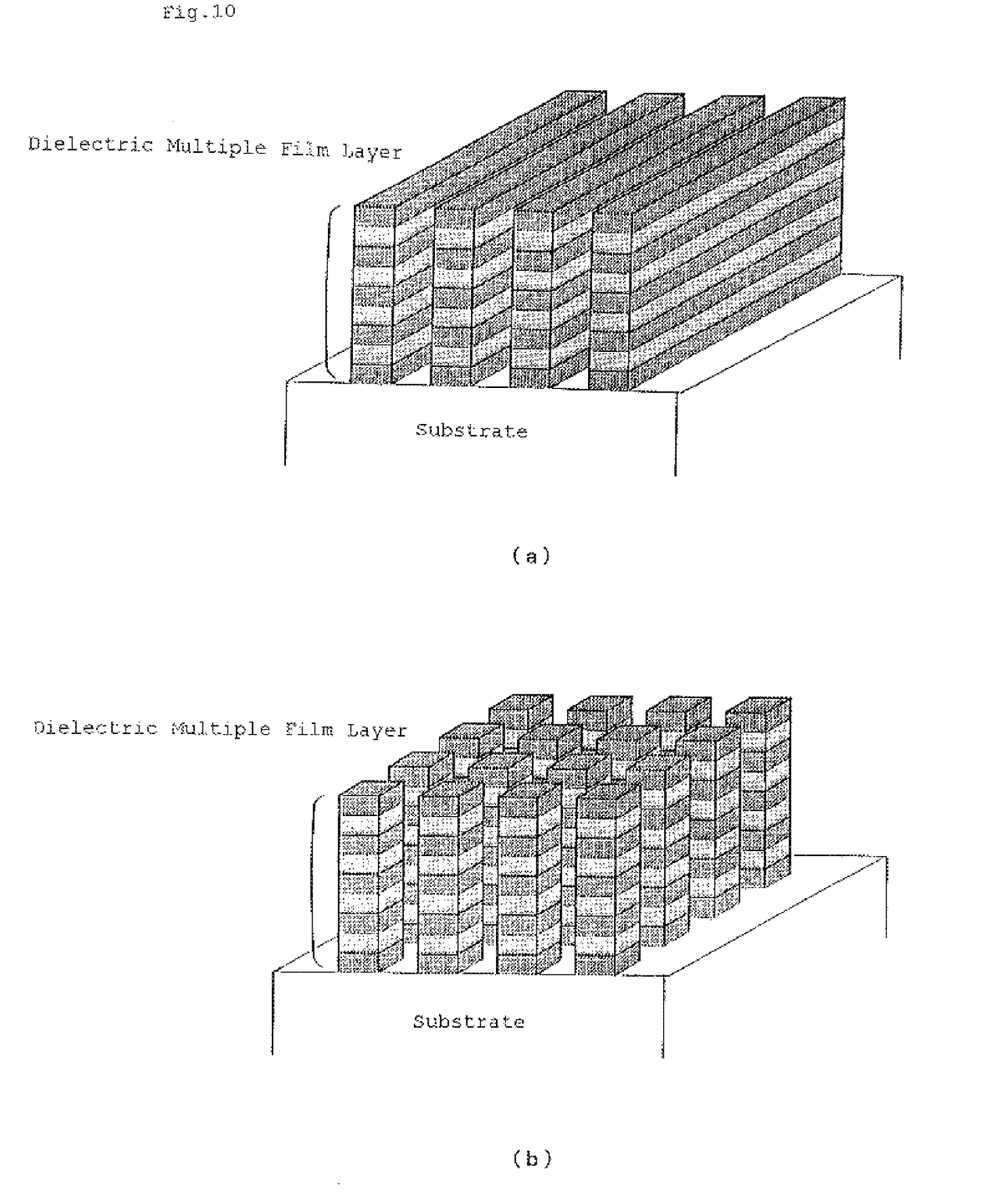

On the other hand, it is already known that a diffraction grating in which periodic convexo-concave structures are formed on a dielectric multiple film layer in one direction, as shown in FIG. 10(*a*), has superior characteristics as a polarized light beam splitter (Rong-Chung et al., OPTICS LETTERS Vol. 21, No. 10, p761, 1996).

Also, a diffraction grating in which periodic convexo-concave structures are formed on a dielectric multiple film layer in two directions, as shown in FIG. 10(*b*), has been proposed as a photonic crystal of three dimension (E. Yablonovitch, Journal of the Optical Society of America B Vol. 10, No. 2, p283, 1993).

At the present time, a dielectric multiple film layer itself has been widely used in various technical fields as a mirror, etc., and also various techniques have been already established as the method for manufacturing thereof, including an electron beam. evaporation method, a heating evaporation method and a sputtering method.

Also, since the technology for forming the periodic convexo-concave structures on a dielectric multiple film layer is similar to the so-called patterning technology for producing VLSI (very large scale integration), etc., a diffraction grating, in which periodic convexo-concave structures are formed on a dielectric multiple film layer, can be produced by adopting the patterning technology for producing VLSI on a dielectric multiple film layer.

More concretely, as the technology for such patterning, there is known a wet etching (chemical etching) method by using an etchant including hydrofluoric acid, etc., or a dry etching (physical etching) method by using a reactive ion etching, etc., which is applicable thereto.

It is possible to manufacture a diffraction grating and so on by adopting the above-mentioned film forming and etching method. However, as is mentioned above, there is a problem with the care and the treatment of the etchant in the wet etching, and also a problem in the dry etching in that the facility of a vacuum container or the like is necessitated, thereby requiring a large-scale facility by itself. Additionally, in the dry etching, it is not cost-affective because a pattern mask must be formed by a further complicated photolithography technique including the steps of resist film painting, drying, exposure, baking, development and so on.

Moreover, when processing the etching on the dielectric multiple film layer laminated with plural kinds of layers, it is difficult to obtain a clear cross-section shape due to the difference in etching rates among the respective layers thereof.

SUMMARY OF THE INVENTION

Therefor, according to the present invention, for resolving such drawbacks mentioned above, there is provided a laser processing method to a glass substrate and an optical diffraction element obtained thereby with respect to the first and the second invention of the present application, comprising the steps of: forming a thin film of a material showing superior absorption characteristics of a laser beam to that of the glass substrate, on a surface of which said thin film is formed; radiating the laser beam having an intensity distribution onto said thin film; and removing the thin film depending on the intensity distribution of the laser beam by fusion, evaporation or ablation which occurs by making said thin film absorb energy from the laser beam radiated thereon, wherein said thin film is made of inorganic materials, and a thickness or an absorption index of said thin film with respect to an intensity of the laser beam is set at a value less than a threshold value that is enough for the laser beam to reach a surface of said glass substrate penetrating through said thin film to cause the fusion, evaporation or ablation.

As the thin film, there is appropriate a single layer or a plurality of layers of one or any combination of a glass of a metal oxide, a metal nitride, a metal carbide, a semiconductor, and silicon dioxide ($SiO_2$), a fluoride glass, and a chalcogenide glass.

And as a method of forming the thin layer or film, various methods can be applied thereto, including a sol-gel method, a sputtering method, a vacuum deposition method, and liquid-phase epitaxy method, and so on.

Energy loss of the laser beam, which occurs when it passes through the thin film, can be controlled by controlling a thickness of the thin film and an absorption index. However, in a case where it is necessary to keep a certain thickness, it may be controlled by varying (mainly) the absorption index for the laser beam.

And as a method of controlling the absorption index, there are a method of intensively introducing a shift in a ratio of quantum theory, such as of defective oxygen, a method of introducing a defect, a method of doping an ion showing high absorption with respect to the wavelength used, a method of mixing amicrons or ultra fine particles, a method of mixing a pigment, a method of mixing an organic pigment, etc.

Further, it is possible to produce an optical diffraction element for use as a diffraction grating or a hologram installed in an optical coupler, a polariscope, a wave divider, a wavelength filter, a reflector, a mode transducer, etc., by using a laser beam having a periodic or regulative distribution in optical intensity.

Here, when forming the convexo-concave pattern on the thin film formed on the surface of the glass substrate by the laser beam, the thickness of the thin film becomes automatically to be equal to the thickness of the convexo-concave structure, by developing the ablation until the glass substrate appears at the bottom of the concave portion of the thin film.

A laser beam having such a periodic optical intensity distribution can be obtained by a phase mask, or by interference between the laser beams, and thereby the configuration of a cross-section of the periodic convexo-concave pattern formed on the surface of the glass substrate can be controlled by the pulse energy of the laser beam. Moreover, a laser beam having such a regulative optical intensity distribution can be obtained by using a net shaped mask, and so on.

On the other hand, a method for manufacturing an optical element with respect to the third invention of the present application comprises the steps of: forming a dielectric multiple film layer, which comprises plural kinds of layers having different permittivities on the surface of a substrate; irradiating a laser beam having an intensity distribution onto said dielectric multiple film layer; and removing a portion of the dielectric multiple film layer depending on the intensity distribution of the laser beam by fusion, evaporation or ablation which occurs by making said dielectric multiple film layer absorb energy from the laser beam radiated thereon, so as to leave the other portions as the periodically arranged dielectric convex portions having a grating constant corresponding to the wavelength of the beam.

Here, it is preferable that the material forming said dielectric multiple film layer has a threshold value to cause the fusion, evaporation or ablation with respect to the laser beam that is lower than that of the substrate, and that it has a large adhesion in the film thereof. Concretely, silicon oxide, titanium oxide, cerium oxide, germanium oxide, magnesium fluoride, calcium fluoride, tantalum oxide, etc., are appropriate.

Further, the film layer forming each layer of the multiple film layer can be formed as a glass (amorphous), in a single crystal or in a polycrystal.

In a case where said laser beam has the periodic intensity distribution in one direction, such laser beam can be obtained either through a phase mask or through an interference between two laser beams.

In a case where said laser beam has periodic intensity distributions in two directions, such laser beam can be obtained through an interference among at least three laser beams.

As a source of the laser beam, an excimer laser such as KrF, an Nd-YAG laser, a Ti:Al$_2$O$_3$ laser and the high harmonics thereof, or a pigment laser can be used, and preferably, a laser beam having a lower reflectivity with respect to the dielectric multiple film layer to be processed should be used.

BRIEF DESCRIPTION OF THE DRAWINGS

FIG. 10(b) is a perspective view of the diffraction grating formed with periodic convexo-concave patterns in two directions disclosed in the document of the prior art.

DESCRIPTION OF THE PREFERRED EMBODIMENTS

Hereinafter, detailed, explanation of the embodiments according to the first and second invention and comparisons will be given by referring to the attached drawings. First of all, a chart comparing between the embodiments and the comparisons in main items is shown below.

Embodiment 1

On a soda-lime glass there is formed an SiO$_2$ thin layer or film, in which colloidal Ag is dispersed. As a method for forming, there is used a sputtering method, in which an SiO$_2$ target and a chip of silver metal are positioned on a target and are sputtered at the same time. The sputtering condition is set as below for growing a film. And, as the target, there is used a quartz target which is positioned below and which has a size of 5 inches×20 inches, on which thirty two (32) disc-shaped chips of silver (having diameters of about 4 mm) are positioned in dispersed locations.

Sputtering Condition:
 Gas flow: oxygen 3 sccm, Argon 97 sccm
 Pressure when sputtering: 2.8×10$^{-3}$ Torr
 Applied electric power: 3.0 kW
 Substrate: Soda lime glass The thin film obtained is a clear film which is brown colored, and has a flat surface and strong adhesion. The film grows to be 315 nm in thickness with 5 minutes of film growing time. And, a concentration of silver in the film which is measured by XPS (X-ray photoelectron spectroscopy) is 0.94 atom %.

Measuring an absorption spectrum of the thin film, a peak of absorption is in the vicinity of 390 nm. It can be thought that this is caused by plasmon absorption by amicrons or ultra fine particles of silver (colloid) and that the amicrons or ultra fine particles of silver are produced in the glass during the growing of the film.

Figure 1:
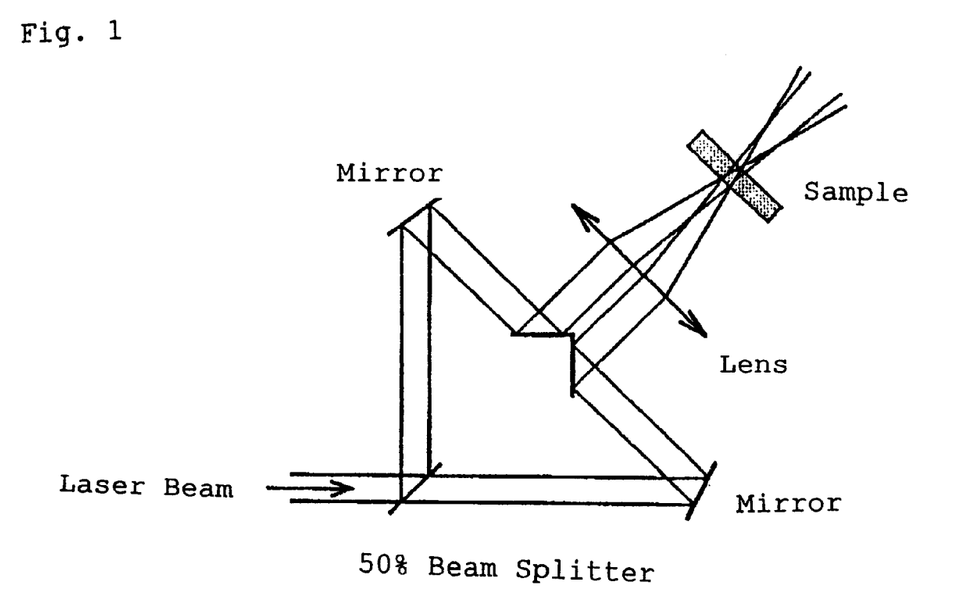
FIG. 1 is a schematic diagram of an apparatus for manufacturing a diffraction grating by a method in accordance with the present invention using laser interference.

A micro processing or machining is carried out by conducting an ablation on the thin film upon the surface of the glass, by an optical system shown in FIG. 1.

In the optical system shown in FIG. 1, a single laser beam is divided into two laser beams and then they are again focused on the thin film of the glass, thereby obtaining a periodically changing pattern of intensity by the interference therebetween. The laser which is used is an Nd:YAG laser having a pulse width of 10 ns, a repetitive frequency of 10 Hz, and the wavelength used is a 3rd high harmonic of 355 nm. The irradiation energy of the laser beam before division into two beams is about 110 mJ/Pulse. The laser beam, after being divided by a 50% beam splitter and passing through the quartz lens, is irradiated onto the surface of a sample, and the two divided laser beams are combined to produce the interference, thereby forming the periodic distribution condition of the optical intensity. An angle defined between the laser beams is about 10 degrees. The diameter of the laser beam on the sample is 2 mm, and the energy density thereof is 4.14 J/cm$^2$ Pulse. The energy is set at a value a little bit higher than that of the energy sufficient to cause the ablation on the thin film, which is previously determined.

Figure 2:
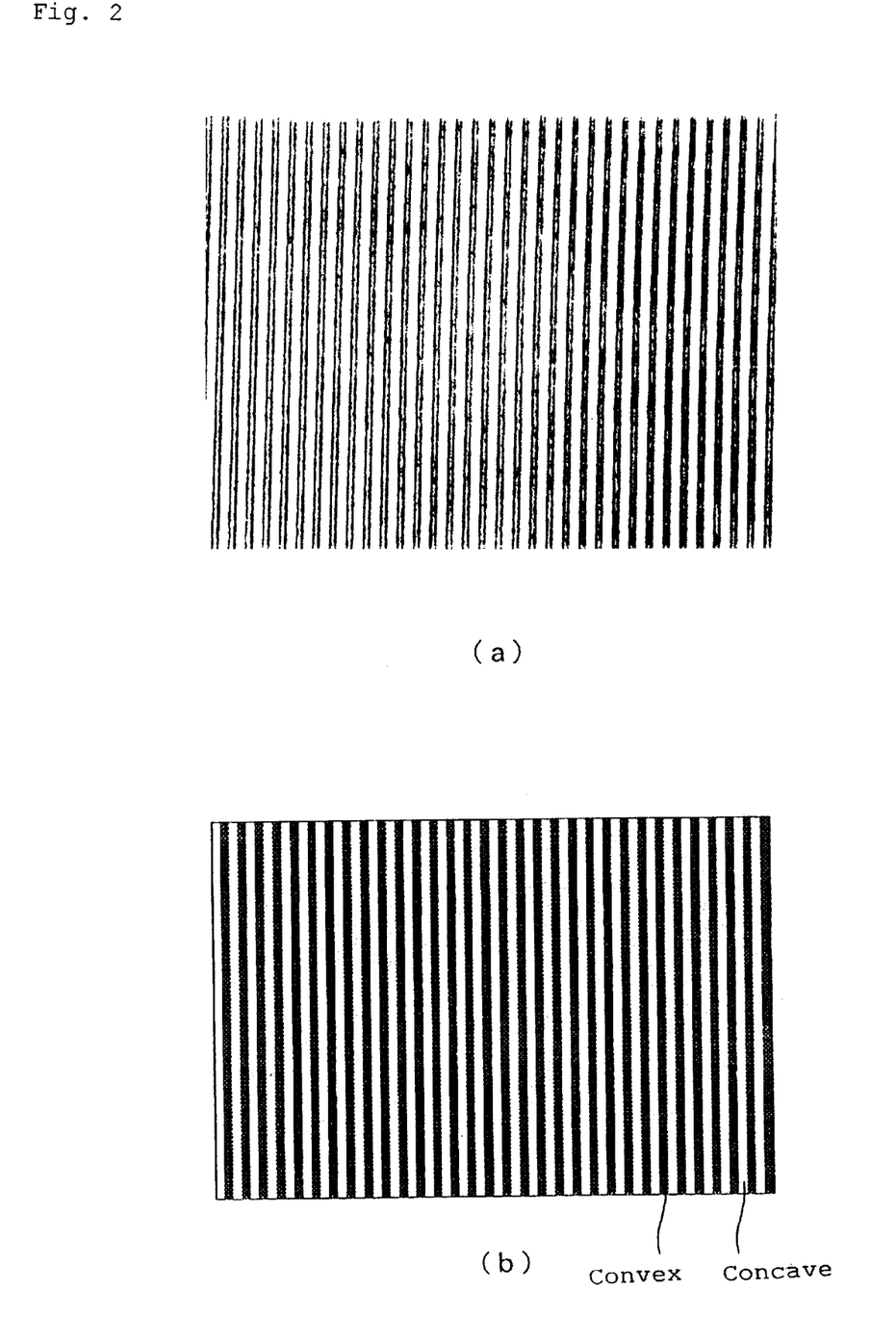
FIG. 2(a) shows a photomicrograph by an optical microscope of the surface of the thin film after micro processing (×1,000)
FIG. 2(b) is a drawing produced on the basis of the same photo.
Figure 3:
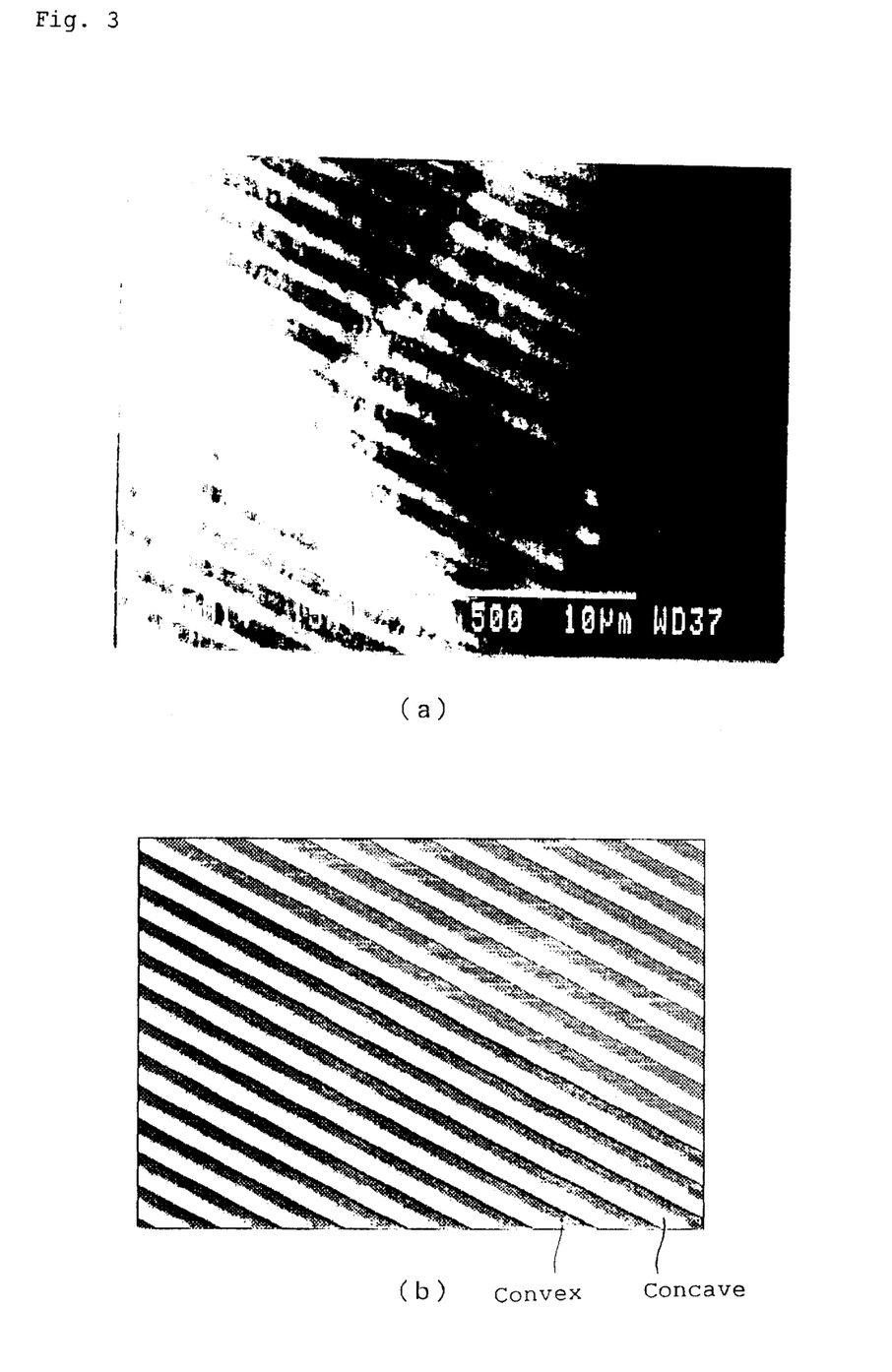
FIG. 3(a) shows a photomicrograph by a scanning type microscope of the surface of the thin film after micro processing (×3,500)
FIG. 3(b) is a drawing produced on the basis of the same photo.

The film which is processed is inspected through an optical microscope and an electron microscope. FIG. 2(a) is a photomicrograph taken by an optical microscope at 1,000× magnification, FIG. 2(b) is a drawing produced on the basis of the same photo, FIG. 3(a) is a photomicrograph taken by a scanning type microscope at 3,500× magnification, and FIG. 3(b) is a drawing produced on the basis of the same photo. From those drawings, it can be ascertained that a periodic convexo-concave pattern of about 1 μm is formed on the film.

In the embodiment, an absorption coefficient of the thin film is 46,212 cm$^{-1}$ at 355 nm. The absorption coefficient of the soda-lime glass substrate is 0.3081 cm$^{-1}$. The energy reaching the substrate, which is calculated by the absorption coefficient and the thickness of the thin film, is 0.95 J/cm$^2$ Pulse.

On the other hand, a threshold value of the ablation of the glass is experimentally obtained. Namely, while increasing the irradiation energy, the energy at the time when the ablation occurs is recorded. An area of a mark or trace of the ablation is necessary for calculation of the power density, however, it is impossible to measure it correctly because of hard cracks appearing around the irradiation trace. Obtained from roughly estimating the area from it, the power density is found to be at least 8 to 10 J/cm$^2$ Pulse by the laser of the present embodiment. Accordingly, it can be thought that since the energy reaching the substrate is less than the threshold value necessary for the ablation of the substrate, the ablation occurs preferably on the thin film, thereby obtaining a fine processing.

Comparison 1

On a soda-lime glass substrate, there is formed an SiO2 thin film, in the same manner as in Embodiment 1. In this case, no silver is positioned on the target, therefore, a thin film of $SiO_2$ only can be formed. The thus-obtained thin film is processed by the laser using the same optical system as in Embodiment 1. As a result of this, selective processing of the thin film is impossible, and the ablation occurs on both the substrate and the thin film. The energy in this case is 9 J/cm$^2$ Pulse. By measuring the absorption coefficient, the absorption coefficient of the substrate is found to be the same as in Embodiment 1. However, it is less than 0.001 cm$^{-1}$ with the $SiO_2$ film, and therefore the $SiO_2$ film is lower than the substrate with respect to the absorption coefficient. Further, the energy reaching the substrate is close to the threshold value of the ablation, thereby it is thought that effective processing is impossible.

(See Chart below.)

of the silver. The summary is summarized in the above chart. The lower the concentration of the silver, the less the absorption coefficient of the film.

The ablation by using the interfered light is carried out on the glass attached with the thin film in the same manner as in Embodiment 1. As a result of this, the periodic pattern is formed on the film surface, and it functions as the diffraction grating. Every one of the thin films, as is apparent from the chart, has an absorption coefficient higher than that of the substrate, and also the laser energy reaching the substrate is lower than the threshold value for causing the ablation on the substrate.

Comparisons 2 and 3

Under the same conditions as in Embodiments 4 and 5, an $SiO_2$ thin film in which colloidal Ag is dispersed is formed. This is achieved by introducing those samples into the same chamber with Embodiments 4 and 5 at the same time, for the purpose of obtaining completely identical film characteristics. However, the substrate is made of a material having an ablation threshold value (3.5 J/cm$^2$ Pulse) which is lower than that of the substrate of Examples 1 through 5 (see the chart).

A substrate (glass matrix) in which are dispersed amicrons or ultra fine particles of Cds or CdSe is widely used as a sharp cut filter.

The ablation is carried out on the manufactured glass substrate with the thin film attached under the same conditions of Embodiment 1. As a result of this, only a very small possibility in achieving effective processing can be found in the processing of Comparison 2 as the diffraction grating, Chart

| Sample | Irradiating Energy J/cm$^2$ Pulse | Kind of Thin Film | Thickness of Film (nm) | Absorption Coefficient of Film (cm$^{-1}$) | Transmission Factor | Energy Reaching Substrate J/cm$^2$ Pulse | Absorption Coefficient of Substrate (cm$^{-1}$) | Threshold Value of Substrate J/cm$^2$ Pulse | Processability |
|---|---|---|---|---|---|---|---|---|---|
| Embodiment 1 | 4.14 | Ag-SiO$_2$ Film | 315 | 46,212 | 0.23 | 0.95 | 0.3081 | about 8 to 10 | ○ |
| Embodiment 2 | same | Same | 297 | 23,877 | 0.49 | 2.0 | same | same | ○ |
| Embodiment 3 | same | Same | 276 | 10,767 | 0.74 | 3.1 | same | same | ○ |
| Embodiment 4 | same | Same | 290 | 6,490 | 0.83 | 3.4 | same | same | ○ |
| Embodiment 5 | same | Same | 164 | 2,235 | 0.96 | 3.9 | same | same | ○ |
| Embodiment 6 | Same sample is used as in Embodiment 1. The phase Mask is used. Conditions of Irradiation are the sane. | | | | | | | | |
| Embodiment 7 | 4.14 | TiO$_2$ Film | 50 | 46,060 | 0.79 | 3.2 | 0.1566 | about 8 to 9 | ○ |
| Embodiment 8 | same | GeO$_2$ Film | 160 | 7,555 | 0.89 | 3.6 | same | same | ○ |
| Embodiment 9 | same | Ag—TiO$_2$ Film | 340 | 58,000 | 0.13 | 0.57 | 0.3081 | about 8 to 10 | ○ |
| Embodiment 10 | same | R6G-SiO$_2$ Film | 120 | 32,000 | 0.67 | 2.7 | same | same | ○ |
| Comparison 1 | 9.0 | SiO$_2$ Film | 315 | Less than 0.001 | more than 0.99 | about 9.0 | 0.3081 | about 8 to 10 | X |
| Comparison 2 | 4.14 | Ag—SiO$_2$ Film | 290 | 6,490 | 0.83 | 3.4 | 377 | 3.5 | Δ |
| Comparison 3 | same | Same | 164 | 2,235 | 0.96 | 3.9 | same | Same | X |

○: Very Good, Δ: Good, X: Bad

Embodiments 2, 3, 4, and 5

In the same manner as in Embodiment 1, on a soda-lime glass substrate, there is formed an $SiO_2$ thin film, in which colloidal Ag is dispersed. With the sputtering conditions, the number of silver targets and the sputtering electric power are adjusted, thereby changing a mixing ratio or concentration and no possibility in effective processing with Comparison 3 is found because of damage on the substrate. The threshold value for processing the glass substrate is 3.5 J/cm$^2$ with respect to the wavelength of 355 nm, and its absorption coefficient is 377 cm$^{-1}$. The absorption coefficient of the film in Comparison 2 is 6490 cm$^{-1}$, and is higher than that of the substrate. And, the energy reaching the substrate penetrating through the thin film is 3.4 J/cm$^2$ which is somewhat lower than the ablation threshold value of the substrate. On the other hand in Comparison 3, the absorption coefficient of the film is 2235 cm$^{-1}$, being higher than that of the substrate, i.e., 377 cm$^{-1}$, however, the energy reaching the substrate comes up to 3.9 J/cm2 Pulse of the ablation threshold value of the substrate. Accordingly, it can be thought that this point is one reason for losing the possibility of effective processing.

Though the thin film of Embodiment 5 is the same as that of Comparison 3, it can be considered that such discrepancy is caused due to the difference in the threshold value of the substrate.

Embodiment 6

Figure 4:
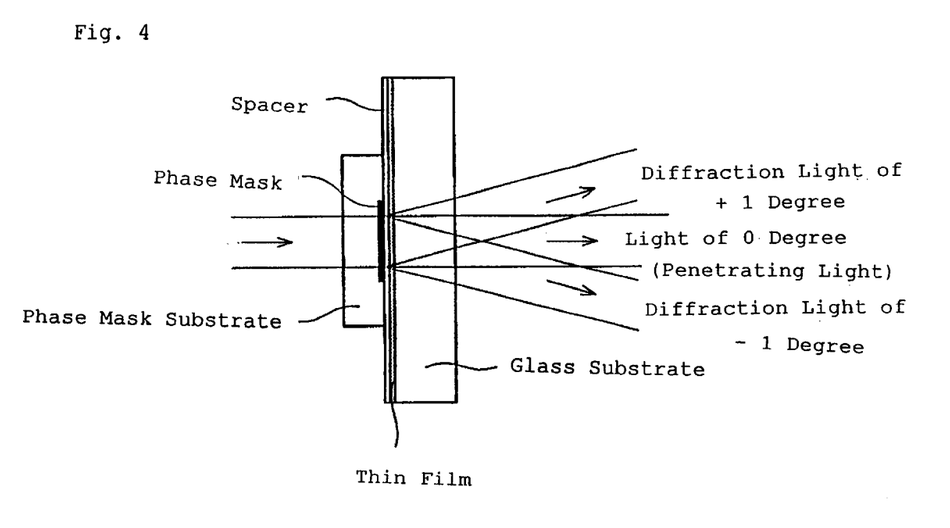
FIG. 4 is a schematic diagram of an apparatus for manufacturing a diffraction grating by a method in accordance with the present invention using a phase mask.

A diffraction grating is manufactured on the same sample used in Embodiment 2, by using the apparatus shown in FIG. 4. In more detail, on the film surface of the Ag—SiO$_2$ film formed on the above glass substrate, there is positioned a substrate having a phase mask, on which the diffraction grating is formed, through a spacer, and then the laser beam is irradiated onto it.

Figure 5:
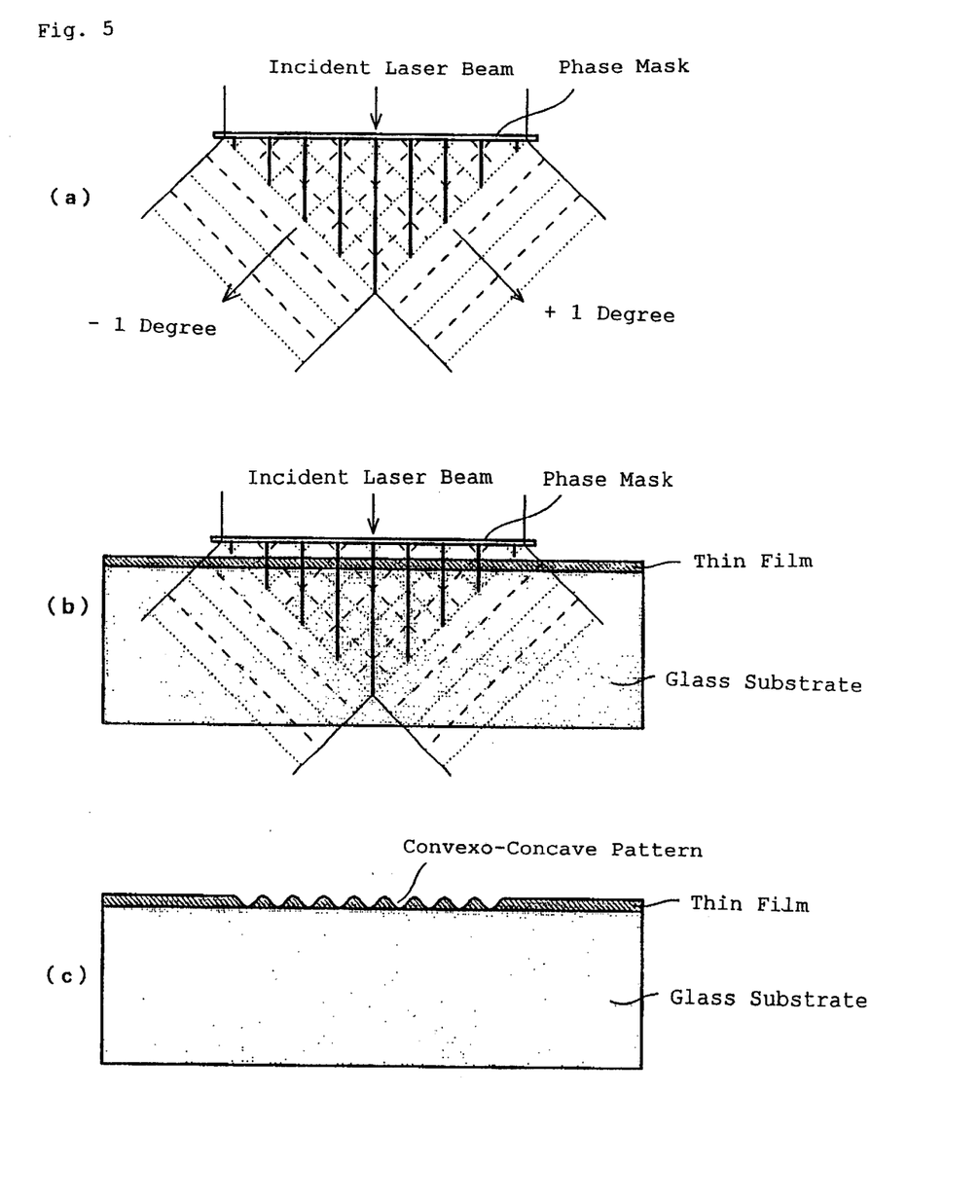
FIG. 5(a) is a drawing for explaining the function of the phase mask.
FIG. 5(b) shows the situation where the laser beam is radiated upon the glass substrate through the same phase mask.
FIG. 5(c) shows the glass substrate which is processed by the laser beam.

With the irradiation of the laser beam upon the phase mask, as shown in FIG. 5(a), a plurality of diffraction light beams mainly included in an arc corresponding to +1 degree, 0 degree and −1 degree are emitted therefrom, then, by the mutual interference of the diffracted light beams, a periodic distribution of optical intensity is obtained in the vicinity of the emission side of the phase mask.

In the present embodiment, there is used a phase mask having a diffraction grating frequency of 1055 nm, a depth of the diffraction grating being about 250 nm, and a size of 10 mm×5 mm (made by QPS Technology Inc., Canada).

And, on the region where the periodic intensity distribution appears, as shown in FIG. 5(b), there is set a glass substrate, on the surface of which is formed the thin film. As a result of this, as shown in FIG. 5(c), an evaporation or an ablation of the thin film occurs depending on the periodic optical intensity, thereby being manufactured the diffraction grating, which is processed upon the thin film on the glass substrate and which has the same frequency as that of the periodic optical intensity. The relationship between the threshold value of the glass and the threshold value of the thin film is in the same condition as that mentioned with respect to Embodiments 1 and 2.

As the laser beam, in the same manner as in Embodiment 1, there is used the $_3$rd high harmonic light beam of 355 nm from an Nd:YAG laser. The duration of the laser pulse is about 10 nsec, and the repetitive frequency thereof is 5 Hz. The energy of the laser beam per one pulse is controllable by changing the timing of an element, the so called "Q switch", of the laser, and the laser beam which is used is set at an energy of 110 mJ/pulse, and the diameter thereof is set to about 5 mm. For increasing the energy density of the laser beam for use in processing, the laser beam is focused by a lens having a focal length of 250 nm, thereby obtaining a laser spot having a diameter of about 2 mm on the glass substrate.

In the present embodiment, comparing in particular the forming of the diffraction grating in the embodiment mentioned above, the distance between the phase mask and the glass substrate with the spacer is set at about 50 μm. This is for the purpose of inhibiting the adhesion of any evaporation material evaporating from the glass substrate onto the phase mask as far as possible, but the distance itself is arbitrary.

For example, within the area where the light beams of +1 degree and −1 degree overlap each other, the diffraction grating can be manufactured even if the phase mask is closely contacted with the glass substrate, and also the diffraction grating can be manufactured in a similar manner to the present embodiment, even if there is inserted a quartz plate of about 150 μm thickness between the phase mask and the glass substrate, by irradiation of the laser beam thereon. The phase mask can be used repetitively, therefore it is important to keep it clean from such contamination. Accordingly, it is effective to insert the spacer between them.

Embodiments 7 and 8

On a borosilicate glass, called "BK7", as the glass substrate, thin films of TiO$_2$ and of GeO$_2$ are formed by an electron-beam evaporation method. On those thin films, by carrying out the laser processing in the same way in Embodiment 1, the periodic pattern can be obtained in a similar manner. Consequently, it is apparent, that the threshold value for processing on those thin films is lower than 4.14 J/cm$^2$. The threshold value for the processing of the BK7 glass is from 8 to 9 J/cm$^2$ at 355 nm, and a penetrating energy, which can be calculated from the absorption coefficient of the TiO$^2$ (46,060 cm$^{-1}$) and the film thickness, is 3.2 J/cm$^2$. The absorption coefficient of the GeO$_2$ is 7,555 cm$^{-1}$ and the penetrating energy is 3.6 J/cm$^2$. Namely, the threshold value for the processing is higher than those values, thereby it is thought that a stable laser processing of the thin film can be achieved.

Further, from the result of X-ray diffraction, it becomes clear that though the thin film of GeO$_2$ shows the nature of glass, the TiO$_2$ film is crystallized and has a crystal structure of the so-called "anatase" type. Consequently, it becomes apparent that the present invention is applicable not only to the thin film in a glass state but also to films in a state of crystallinity. Note, however, that they must fulfill the requirements defined in the claims.

Embodiment 9

On a soda-lime glass substrate there is formed a TiO$_2$ thin film, into which colloidal gold is dispersed by a sol-gel method. As materials of manufacturing, the thin film mainly includes titan tetrabutoxyde (TTB), with which is mixed acetylacetone (AA) of 4-times equivalent mol weight this is helpful to obtain a thin film of good quality, since it proceeds hydrolysis of water which participates in the main reaction of the sol-gel reaction. As a reacting solution for the hydrolysis, there is used an aqueous solution of NaAuCl$_4$ dissolved at a concentration of 0.16 mol/l. After the reaction by combining and agitating 12 ml of TTB, 12 ml of ethanol for dilution, 4 ml of AA and an aqueous solution of 3 ml of NaAuCl$_4$ for thirty (30) minutes, the resulting solution is painted on the glass substrate by a dip method. After the painting, it is heated for fifteen (15) minutes in air at 400° C. so as to evaporate the remaining organic materials and to obtain a sticky film. In this case, amicrons or ultra fine particles of gold are deposited and the thin film changes to a blue color. This is caused due to plasmon absorption by the amicrons or ultra fine particles of gold within the TiO$_2$ film. The process including the painting and the heat treatment is repeated three (3) times, thereby obtaining a thin film at a thickness of 340 nm.

On the thin film, a diffraction grating is produced by using the same optical system and irradiation energy as in Embodiment 1. As a result, such a periodic structure is similarly formed on the glass'substrate.

The absorption coefficient of the thin film comes to 58,000 cm$^{-1}$ at 355 nm, and the energy reaching the substrate can be estimated to be 0.57 J/cm$^2$, which is far lower than the threshold value of the substrate. Though this thin film is amorphous, the main composition of it is the same as $TiO_2$ shown in Embodiment 7. In the present embodiment, the absorption coefficient of the thin film is greater than that of Embodiment 7, thereby it is indicated that the absorption coefficient can be adjusted, by dispersing the amicrons, or ultra fine particles, such as of gold, into the materials.

Embodiment 10

As one of the methods for obtaining a glass thin film, a method of depositing $SiO_2$ has been known. In such a method, a LPD (Liquid Phase Deposition) method is disclosed and known in A. Hishinuma et al., Applied Surface Science, 48/49 (1991) 405.

A film is formed on the soda-lime glass substrate by using the LPD method, in which rhodamine 6G (R6G) is mixed into the $SiO_2$, which is selected as one example of organic pigments.

Forming of the thin film is conducted in the following manner. First, the $SiO_2$ glass is dipped into a solution of silicon fluoride ($H_2SiF_6$), thereby making a saturated solution thereof. After the saturation, the R6G is mixed in so as to obtain a concentration of about 0.2 mol/l. Then, the glass substrate is dipped into the liquid, and a chip of aluminum is also put in it. The aluminum has the function of shifting the equilibrium of the silicon fluoride saturated with $SiO_2$ toward such a direction that $SiO_2$ is deposited, thereby developing the $SiO_2$ thin film deposited on the glass substrate. At this time, since the pigment is mixed, the pigment is also introduced onto the glass thin film.

The thus obtained thin film is red colored, therefore it can be easily noticed that the pigment of rhodamine was introduced into the film.

On the thin film, a diffraction grating is produced by using the same optical system and irradiation energy as in Embodiment 1. As a result, a periodic structure is similarly formed on the glass substrate. However, there can be found a portion in which the film is removed thereby exposing the glass substrate, which is thought to be due to weak adhesion thereof.

The absorption coefficient of the thin film is 38,500 cm$^{-1}$ at 355 nm, and the energy reaching the substrate can be estimated to be 0.57 J/cm$^2$, which is far lower than the threshold value of the substrate.

As is explained in the above, in accordance with the first and second invention, the micro processing is achieved by irradiating the laser beam onto the thin film, which is formed on the surface of the substrate, such as a glass substrate, and which has an absorption characteristic for the laser beam superior to that of the material of the substrate. In other words, not by processing by irradiating the laser beam directly onto the substrate, and thereby, a solid laser device which is easy in handing and cheap in price, such as the Nd:YAG laser can, be applied thereto. Also, an excimer laser utilizing Ar and F as a light-emission source which is poor in coherence, is not necessary and in addition thereto, it is also possible to use the wavelengths of 1,064 nm and its high harmonics of 532 nm, 355 nm, and 266 nm and so on, which were previously believed to be impossible to use for processing directly on glass.

Further, in accordance with the first and second invention, since the thin film is made of mainly inorganic materials, it is possible to obtain a product having superior environmental resistance, and the thickness or the absorption coefficient of the thin film is adjusted so that the energy reaching the substrate is lower than that of the processing threshold value of the substrate, thereby making possible the micro processing of only the thin film portion so as to obtain a product having high accuracy.

Furthermore, in accordance with the first and second invention, by removing a portion of the thin film until the surface of the glass substrate is exposed in the concave portion of the convexo-concave structure formed on the thin film, it is possible to control the depth of the convexities and concavities of the optical diffraction element by the thickness of thin film, thereby providing an easy method for producing an optical element of high accuracy.

Hereinafter, detailed explanation of the embodiments according to the third invention and comparisons will be given by referring to the attached drawings.

Embodiment 11

First of all, an explanation will be given on the steps for forming a dielectric multiple film layer on a surface of a substrate.

Figure 6:
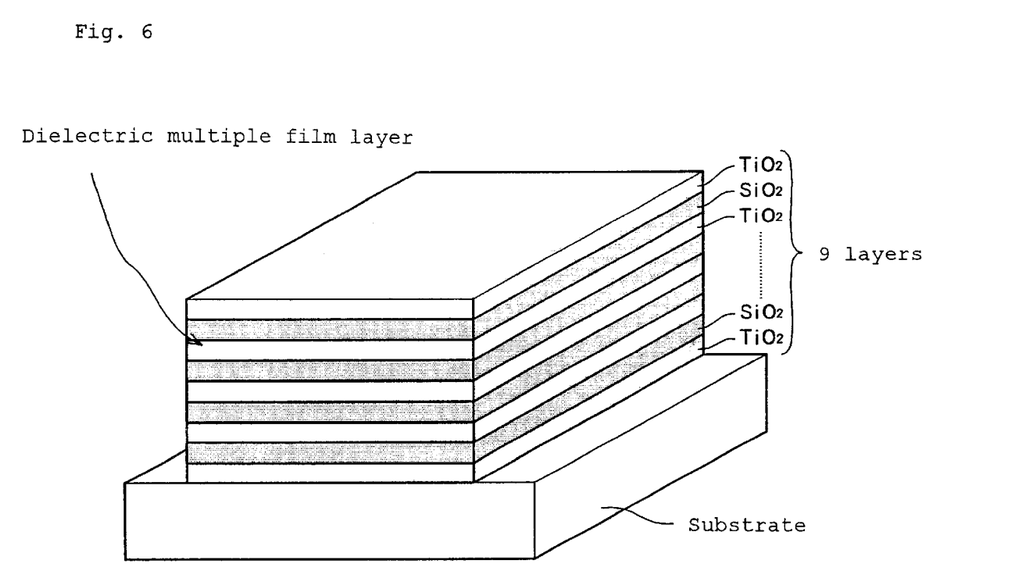
FIG. 6 is an enlarged perspective view showing a substrate, on a surface of which a dielectric multiple film layer is formed.

As the substrate, there is used a substrate of borosilicate glass (BK7 glass substrate) and it is washed by alcohol before starting to form a film layer. The substrate is heated up to 300° C. in an evaporating apparatus, and on the substrate a dielectric multiple film layer is formed by laminating 9 film layers of $SiO_2$ and $TiO_2$, as shown in FIG. 6.

As the material for the $SiO_2$, an $SiO_2$ disc of 2 inches diameter is used, and the thickness of each film of $SiO_2$ is about 104 nm.

And as the material for the $TiO_2$, there is used granulated $Ti_2O_3$, and it is evaporated and formed as the film under the atmosphere of oxide. The thickness of each film of $TiO_2$ is about 50 nm.

The dielectric multiple film layer produced as is mentioned above has the same structure as that of the so-called "mirror of dielectric multiple film layer," and has a peak in reflectivity at about 600 nm.

Measuring the spectral spectrum, it is found that the reflectivity is not so large with respect to light of a wavelength of 300 through 400 nm and the laser beam can sufficiently penetrate through the film layer. Therefore, a laser beam having a wavelength in this range can be used.

More concretely, the third high harmonic wavelength (355 nm) of an Nd:YAG laser is used. Here, the energy of the laser beam is 350 mJ/pulse at a point just after being emitted from the laser source, the pulse width is 5 nsec, and the repetitive frequency is 5 Hz. Also, the diameter of the laser beam is about 7 mm.

This single laser beam is divided into two laser beams through a beam splitter, as shown in FIG. 1, and they are adjusted to irradiate again onto the substrate after passing through the respective different light paths. For obtaining a clear interference pattern on the substrate, it is necessary that the optical distances of the two beams be substantially equal, and that the energy of the beams be about same.

In the present embodiment, the-difference in the optical distances of the two beams is less than 2 cm, and it is sufficiently small in comparison with the spatial length of the pulse of laser light, i.e., 150 cm. Therefore, it is possible to form a clear interference pattern. Further, in the present embodiment, although the energy levels in the two laser beams are different in a ration of about 1:2 due to the differences in the mirror loss at the respective light paths, the clearness of the interference pattern formed is not lost with such a difference in energy levels.

For increasing the energy density, the laser beam is focused with a lens having a focal length of 200 mm so as to obtain a beam size of about 2 mm on the substrate.

In the present embodiment, since the laser beam is irradiated under ambient atmospheric air, a discharge through the air occurs at the focus position of the lens. For removing the effects of this discharge, the position of the glass substrate is adjusted to be located a little bit nearer to the lens than the focus position of lens. Therefore, though the two beams in front of the lens are depicted as parallel lines in FIG. 2, they actually enter into the lens with very small incident angles respectively.

In this manner, after adjusting the optical system, the dielectric multiple film layer produced previously is set at the position where the interference patterns of the laser beams are formed. When irradiating a plurality of pulses of the laser beam, as shown in FIGS. 2(a) and (b) and FIG. 7, the energy of the laser beam is absorbed into the dielectric multiple film layer, and the dielectric multiple film layer, where the absorbed energy exceeds a threshold value for causing fusion, evaporation or ablation, is removed depending on the strength of the laser beam. Thereby a diffraction grating is formed on which a large number of dielectric convex portions are periodically aligned in one direction.

Figure 7:
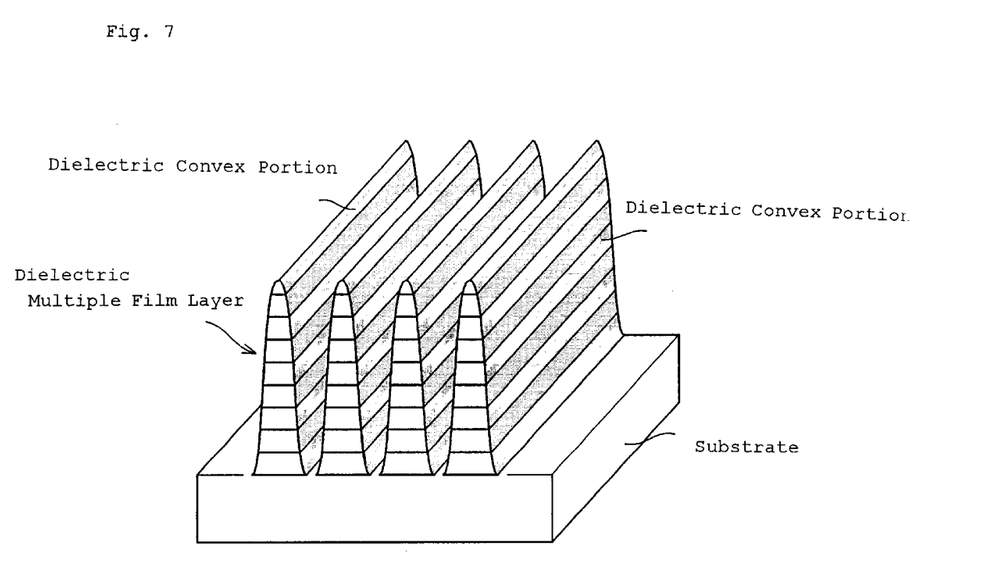
FIG. 7 is a perspective view of the diffraction grating formed with periodic convexo-concave patterns in one direction, manufactured in accordance with a method of the third invention.

As is mentioned above, FIG. 2(a) shows a photomicrograph of the dielectric convex portions which are formed by irradiation of the laser beam, taken by an optical microscope (×1,000), FIG. 2(b) is a drawing produced on the basis of the same photo, and FIG. 7 is an enlarged perspective view of the surface of the same dielectric multiple film layer.

Here, it should be noted that the $SiO_2$ film layer of the plural layers comprising the dielectric multiple film layer has a low absorption coefficient with respect to the laser beam of 355 nm in the present embodiment, and that it is not easily evaporated in comparison with $TiO_2$. In spite of this, the $SiO_2$ film layer as well as $TiO_2$ is evaporated, since the $SiO_2$ film layer which is sandwiched with $TiO_2$ layers at the top and bottom thereof is also heated and evaporated together with $TiO_2$ layers at the same time.

In this manner, even in a case where there is such difference in the threshold values for occurrence of the fusion, evaporation or ablation of each film layer of the dielectric multiple film layer with respect to the laser beam, the manufacturing method of the diffraction grating in accordance with the present invention can be carried out. However, under such conditions, it is necessary that the adhesion power of the film layer be strong so as to reduce damage to the film layer. As a composition for satisfying this condition of the film layer, besides $SiO_2$ and TiO2, cerium oxide, germanium oxide, magnesium fluoride, calcium fluoride, or tantalum oxide can be used. And, with the same composition of the film layer, it is also possible to increase the strength of the adhesion by properly selecting the manufacturing method of the film, such as by selecting an ion assist electron beam evaporation method, etc.

Figure 8:
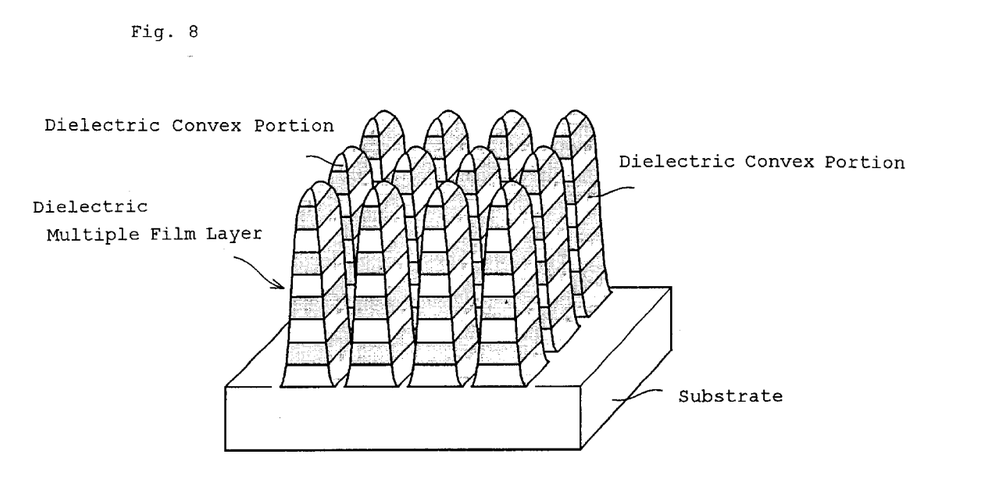
FIG. 8 is a perspective view of the diffraction grating formed with periodic convexo-concave patterns in two directions, manufactured in accordance with a method of the third invention.

In the above embodiment, the interference pattern produced between the two laser beams is utilized. However, not only this pattern but also other patterns produced by use of three laser beams or more can be used. In the case, the diffraction grating produced has a periodicity along the two directions which are perpendicular to each other, as shown in FIG. 8. Namely, it is a kind of three-dimensional photonic crystal.

Further, a similar photonic crystal can be also realized by using the optical system as shown in FIG. 1, turning the substrate by 90 degrees, and processing it twice in the different directions.

Embodiment 12

By using the apparatus shown in FIG. 4, the diffraction grating is produced with respect to the borosilicate glass substrate on which the dielectric multiple film layer is formed in the same manner as in Embodiment 11. FIG. 4 is a schematic diagram of an apparatus for manufacturing a diffraction grating in accordance with the present invention using a phase mask, FIG. 9(a) is a drawing for explaining the function of the phase mask, FIG. 9(b) shows the situation where the laser beam is radiated upon the glass substrate through the same phase mask, and FIG. 9(c) shows the glass substrate which is processed by the laser beam.

In more detail, on the surface of the dielectric multiple film layer which is formed on the glass substrate, a substrate provided with the phase mask, on which the diffraction grating is formed, is positioned through a spacer, and the laser beam is irradiated thereon.

Figure 9:
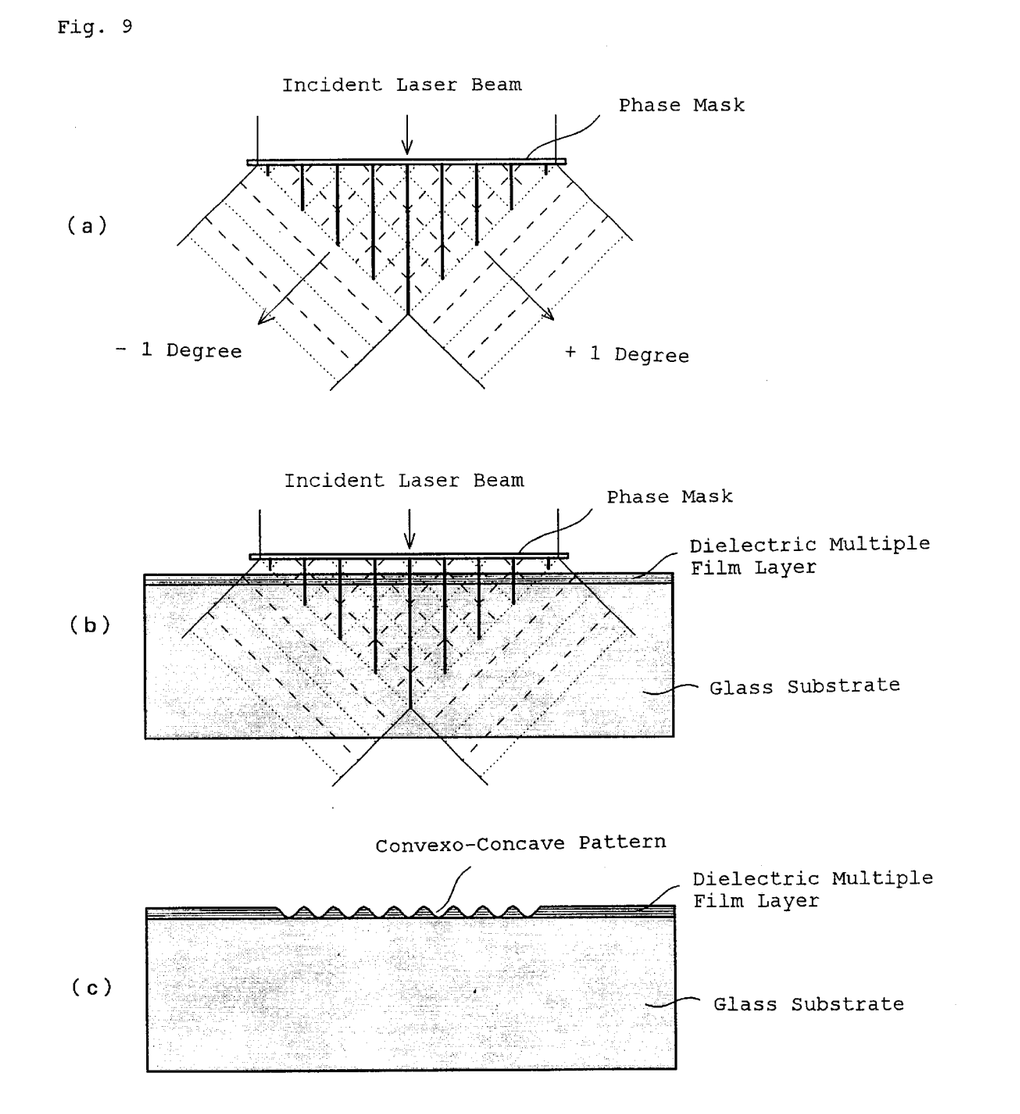
FIG. 9(a) is a drawing for explaining the function of the phase mask.
FIG. 9(b) shows the situation where the laser beam is radiated upon the glass substrate through the same phase mask.
FIG. 9(c) shows the glass substrate which is processed by the laser beam; and, FIG. 10(a) is a perspective view of the diffraction grating formed with periodic convexo-concave patterns in one direction disclosed in the document of the prior art

By the irradiation of the laser beam upon the phase mask, as shown in FIG. 9(a), a plurality of diffraction light beams mainly included in an arc corresponding to +1 degree, 0 degree and −1 degree are emitted therefrom. Then, by the mutual interference of the diffracted light beams, a periodic optical intensity distribution is obtained in the vicinity of the emission side of the phase mask.

In the present embodiment, there is used a phase mask having a diffraction grating frequency of 1055 nm, the depth of the diffraction grating being about 250 nm, and the size being 10 mm×5 mm (made by QPS Technology Inc., Canada).

And, on the region where the periodic intensity distribution appears, as shown in FIG. 9(b), there is set a glass substrate, on the surface of which is formed the thin film. As a result of this, as shown in FIG. 9(c), an evaporation or an ablation of the thin film occurs depending on the periodic optical intensity, thereby being manufactured the diffraction grating, which is processed upon the thin film on the glass substrate and which has the same frequency as that of the periodic optical intensity.

As the laser beam, in the same manner as in Embodiment 11, there is used the third high harmonic light beam of 355 nm from an Nd:YAG laser. The width of the laser pulse is about 10 nsec, and the repetitive frequency thereof is 5 Hz. The energy of the laser beam per one pulse is controlled by changing the timing of an element, the so called "Q switch", of the laser, and the laser beam which is used is set at an energy of 110 mJ/pulse, and the diameter thereof is set to about 5 mm. For increasing the energy density of the laser beam for use in processing, the laser beam is focused by a lens having a focal length of 250 nm, thereby obtaining a laser spot having a diameter of about 2 mm on the glass substrate.

In the present embodiment, comparing in particular the forming of the diffraction grating in the embodiment mentioned above, the distance between the phase mask and the glass substrate with the spacer is set to about 50 μm. This is for the purpose of inhibiting the adhesion of any evaporation material evaporating from the glass substrate onto the phase mask as far as possible, but the distance itself is arbitrary. For example, within the area where the light beams of +1 degree and −1 degree overlap each other, the diffraction grating can be manufactured even if the phase mask is closely contacted with the glass substrate, and also the diffraction grating can be manufactured in a similar manner to the present embodiment even if there is inserted a quartz plate of about 150 μm thickness between the phase mask and the glass substrate, by irradiation of the laser beam thereon. The phase mask can be used repetitively, and therefore it is important to keep it clean from such contamination. Accordingly, it is effective to insert the spacer between them.

As is fully explained above, in accordance with the third invention, the diffraction grating or the photonic crystal can be manufactured, after forming a dielectric multiple film layer on the surface of a substrate, by irradiating a laser beam having an intensity distribution onto said dielectric multiple film layer, removing a portion of the dielectric multiple film layer depending on the intensity of the laser beam, and leaving the other portions as the periodically aligned dielectric convex portions having a grating constant corresponding to the wavelength of the light. Thereby it is possible to manufacture the diffraction grating and so on easily, without processing via photolithography or etching.

In the evaporation process of the dielectric multiple film layer by the laser beam, even if the threshold values for causing fusion, evaporation or ablation with respect to the respective film layers are different from each other, since the middle film layer sandwiched by the top and bottom layers is evaporated at the same time when the top and bottom layers are evaporated, no difference can be found in each layer and a difference in level is hardly formed on the side surface of the dielectric convex portion, in comparison with the ordinary etching process.

What is claimed is:

1. A laser processing method to a glass substrate, comprising the steps of:

forming a thin film of material showing superior absorption characteristics of a laser beam to that of the glass substrate, on a surface of which said thin film is formed;

radiating the laser beam having an intensity distribution onto said thin film; and removing the thin film depending on the intensity distribution of the laser beam by fusion, evaporation of ablation which occurs by making said thin film absorb energy from the laser beam radiated thereon, wherein a plurality of concave portions are simultaneously formed on said thin film, said thin film is made of inorganic material, a thickness or an absorption index of said thin film with respect to the laser beam is set at a value less than an intensity required for the laser beam to reach a surface of said glass substrate penetrating through said thin film to cause the fusion, evaporation or ablation, and a laser processing is treated until the surface of said glass substrate appears on the concave portion on which the laser beam having the highest intensity is radiated.

2. A laser processing method to a glass substrate as defined in claim 1, wherein the absorption index with respect to the laser beam is adjusted by applying any one of the following methods, including a method of intensively introducing a shift in a ratio of quantum theory, such as of defective oxygen, a method of introducing a defect, a method of doping an ion showing high absorption with respect to wavelength, a method of mixing amicrons or ultra fine particles, a method of mixing a pigment, or a method of mixing an organic pigment.

3. A laser processing method to a glass substrate as defined in claim 1, wherein the laser beam is a laser beam having a periodic optical intensity distribution.

4. A laser processing method to a glass substrate as defined in claim 3, wherein the laser beam having a periodic optical intensity distribution is obtained by a phase mask.

5. A laser processing method to a glass substrate as defined in claim 3, wherein the laser beam having a periodic optical intensity distribution is obtained by interference of the laser beam.

6. A laser processing method to a glass substrate as defined in claim 1, wherein said thin film is coated by a single layer or a plurality of layers of one or any combination of a glass of a metal oxide, a metal nitride, a metal carbide, a semiconductor, and silicon dioxide ($SiO_2$), a fluoride glass, and a chalcogenide glass.

7. A laser processing method to a glass substrate as defined in claim 2, wherein said thin film is coated by a single layer or a plurality of layers of one or any combination of a glass of a metal oxide, a metal nitride, a metal carbide, a semiconductor, and silicon dioxide ($SiO_2$), a fluoride glass, and a chalocogenide glass.

8. A laser processing method to a glass substrate as defined in claim 3, wherein said thin film is coated by a single layer or a plurality of layers of one or any combination of a glass of a metal oxide, a metal nitride, a metal carbide, a semiconductor, and silicon dioxide ($SiO_2$), a fluoride glass, and a chalocogenide glass.

9. A laser processing method to a glass substrate as defined in claim 4, wherein said thin film is coated by a single layer or a plurality of layers of one or any combination of a glass of a metal oxide, a metal nitride, a metal carbide, a semiconductor, and silicon dioxide ($SiO_2$), a fluoride glass, and a chalocogenide glass.

10. A laser processing method to a glass substrate as defined in claim 5, wherein said thin film is coated by a single layer or a plurality of layers of one or any combination of a glass of a metal oxide, a metal nitride, a metal carbide, a semiconductor, and silicon dioxide (SiO2), a fluoride glass, and a chalocogenide glass.

* * * * *